United States Patent

[11] 3,574,253

[72] Inventor Charles Kay
Wyoming, Mich.
[21] Appl. No. 800,620
[22] Filed Feb. 19, 1969
[45] Patented Apr. 13, 1971
[73] Assignee J. Raymond Christy Enterprises, Inc.
Grand Rapids, Mich.

[54] CONSTRUCTION UNIT ASSEMBLY AND APPARATUS
14 Claims, 17 Drawing Figs.
[52] U.S. Cl. ................................................. 29/155,
29/200
[51] Int. Cl. ...................................................... B23p 17/00,
B23p 19/00
[50] Field of Search ........................................ 29/155,
200, 200 (B), 208 (D)

[56] References Cited
UNITED STATES PATENTS
3,119,173 1/1964 Glaser .......................... 29/200
3,150,440 9/1964 Jahn .............................. 29/155

Primary Examiner—Thomas H. Eager
Attorney—Price, Heneveld, Huizenga and Cooper

ABSTRACT: A machine and method for rapidly and accurately assembling panels or slabs as of wood and interconnecting binder plates as of steel into structural building unit components, employing dynamic panel spacing and retention in combination with panel slotting and plate insertion.

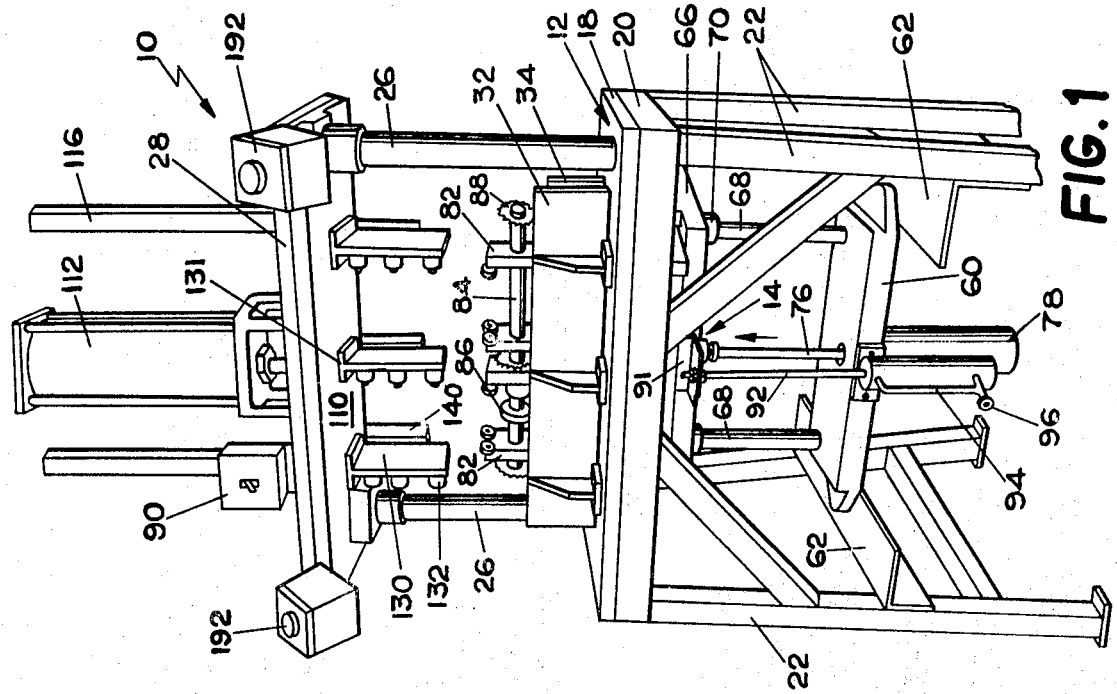

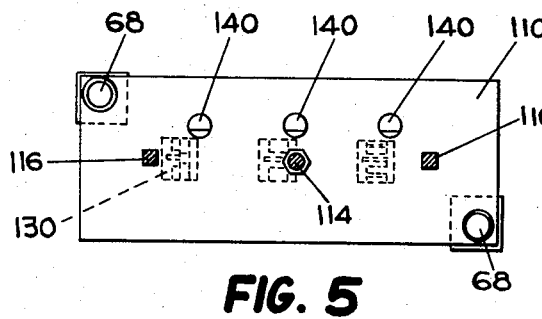
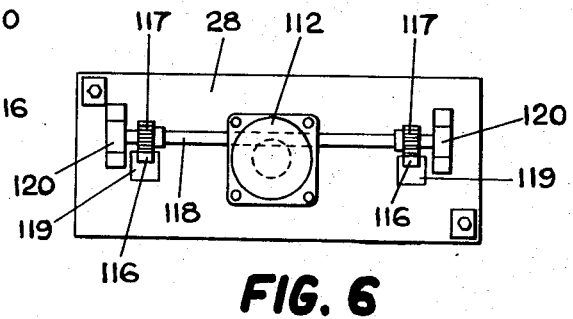
FIG. 5          FIG. 6
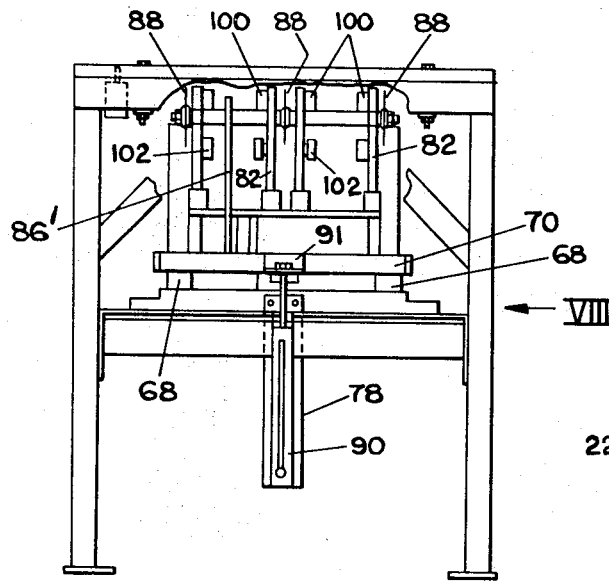
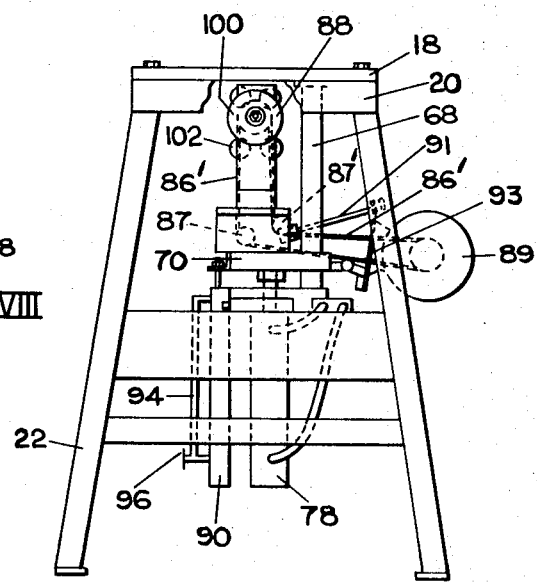
FIG. 7          FIG. 8
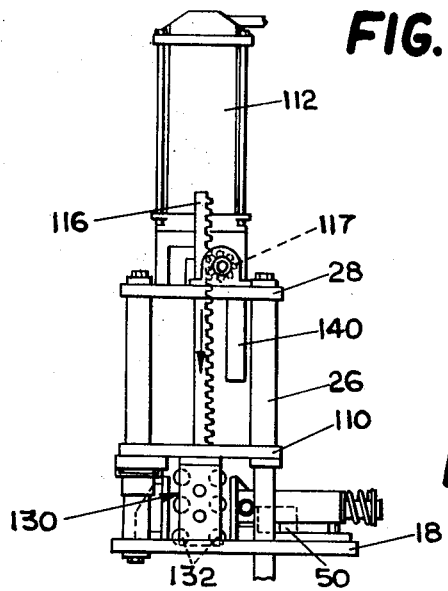
FIG. 3
INVENTOR.
CHARLES KAY
BY Price, Heneveld
Huizenga & Cooper
ATTORNEYS 3,574,253

INVENTOR.
CHARLES KAY
BY
ATTORNEYS

CONSTRUCTION UNIT ASSEMBLY AND APPARATUS

BACKGROUND OF THE INVENTION

This invention relates to assembly machinery and techniques, and more particularly to such for assembling structural building components from slabs or panels and interconnecting plates.

Techniques for construction of houses and similar buildings have basically changed little in many decades. Further, these techniques fall into two basic groups, the first involving complex, time-consuming, relatively expensive construction methods to provide quality housing, and the second involving rapidly assembled, simple, relatively inexpensive construction methods to provide low-quality shelter-type housing. The contrast between these is particularly evident in colder climate regions. Typical of the first type is the "frame" structure employing studs, joints, beams, and rafters upon which outer walls, inner walls, floors, ceilings, etc., are sequentially formed. Typical of the second type are those with concrete block or poured concrete walls, poured floors, etc. To dress up the second type, the exposed surfaces are preferably covered with interior wall paneling, floor coverings, outer wall coverings, etc., but this adds considerable expense.

Traditionally therefore, there are these two alternatives. Unfortunately, however, economic realities dictate the choice for many families.

A few years ago, the inventor herein conceived of a unique building construction employing spaced inner and outer panels interconnected by rigid connector plates to form building "blocks" or units interengageably assembled into a finished load-bearing and enclosing structural "partition" useful for flooring, walls, roofs, etc. There was a need for an apparatus and a method for assembling the plates and slabs rapidly and accurately enough to be practical, yet without losing the interlocking and smooth blending characteristics thereof.

SUMMARY OF THE INVENTION

It is an object of this present invention to provide a novel method and apparatus for rapidly and accurately forming structural building units from slabs and interconnecting binder plates. The slabs are specially spaced and retained during rapid sequential slotting and plate insertion operations, so that the finished block-type units have like dimensions and smooth, secure interengageability to form a load-bearing structural partition with finished surfaces. The panels or slabs to be assembled are spaced and secured as the slot-cutting blades advance between and into the panel faces. On retreat of the cutting blades, the panels are retained during advancement and insertion of the flanged binding plates. The novel apparatus has special spacer means combined with power-cutting means and with power plate insertion means, with these being positioned on opposite sides of a support for the panels. The cutting blades are specially aligned with the plates being held and inserted, but on opposite sides of the slab edges, to enable accurate and uniform assembly.

The apparatus and method enable quality building construction to be obtained rapidly and relatively inexpensively, without the complex costly steps required by conventional building techniques. The invention therefore fills a definite need in construction of houses and similar size buildings.

These and other objects, advantages, and features of the invention will become apparent from a study of the following description taken in conjunction with the drawings.

BRIEF DESCRIPTION OF THE DRAWINGS

FIG. 1 is a perspective view of the novel apparatus, taken generally from one side thereof;

FIG. 2 is a fragmentary elevational view of the upper portion of the apparatus in FIG. 1, viewed from the same side as FIG. 1;

FIG. 3 is a fragmentary elevational view of the upper portion of the apparatus in FIG. 1, and of the portion illustrated in FIG. 2, viewed from the direction indicated by the III in FIG. 2;

FIG. 4 is a sectional view taken on plane IV–IV of FIG. 2;

FIG. 5 is a sectional view taken on plane V–V of FIG. 2;

FIG. 6 is a top plan view of the apparatus, shown with the electrical and pneumatic controls omitted;

FIG. 7 is a fragmentary elevational view of the bottom portion of the apparatus in FIG. 1, viewed from the same side as in FIG. 1;

FIG. 8 is an end elevational view of the bottom portion of the apparatus taken in the direction VIII in FIG. 7;

DESCRIPTION OF THE PREFERRED EMBODIMENT

Figure 10:
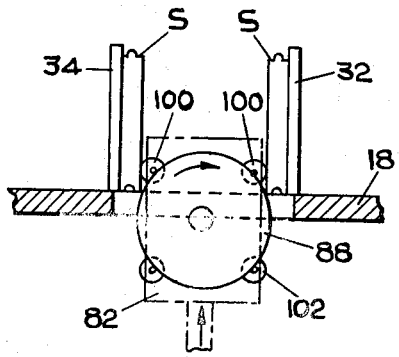
FIG. 10A is an end elevational diagram showing the first stage of the panel-spacing and slot-cutting operation.
FIG. 10B is an end elevational diagram showing the withdrawal slot cutting.
FIG. 10C is an end elevational diagram showing the withdrawal of the cutting mechanism and the simultaneous advancement of the connector plates from the opposite direction.
FIG. 10D is an end elevational diagram showing the actual plate insertion step.
Figure 10:
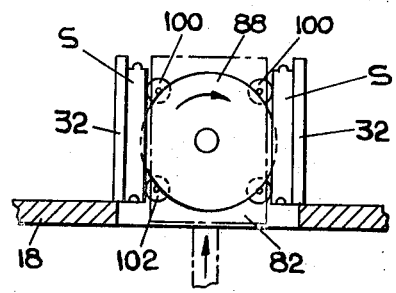
Figure 10:
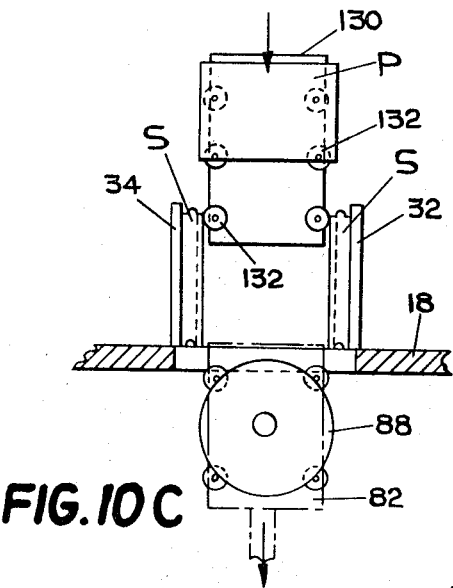
Figure 10:
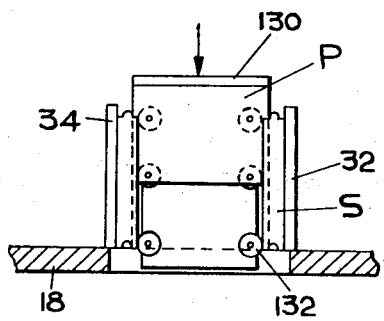
Figure 9A:
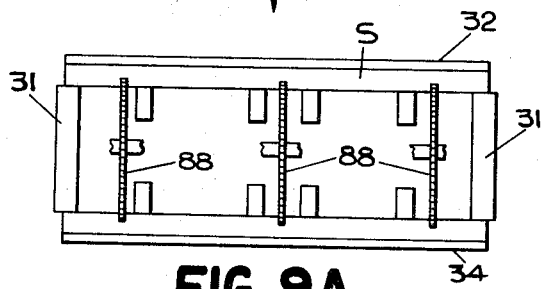
FIG. 9A is a diagrammatic plan view of the slot-cutting stage of the method.
Figure 9:
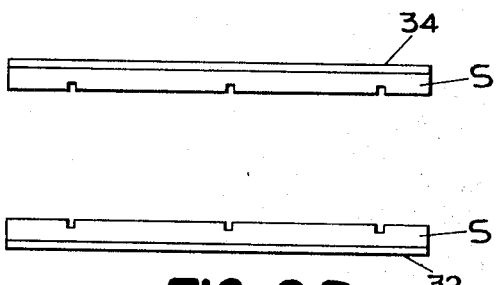
FIG. 9B is a plan diagram of the panels after being slotted.
FIG. 9C is a plan diagram of the plate insertion step of the method.
Figure 9:
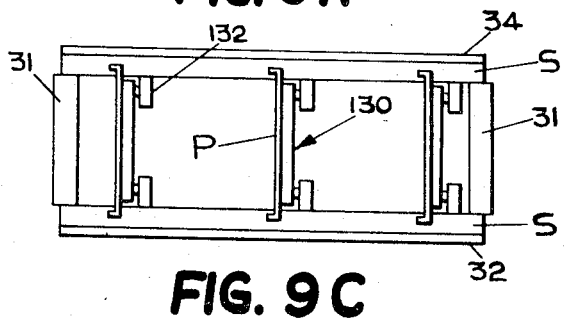

Referring now specifically to the drawings, the apparatus 10 as illustrated includes a central support subassembly 12, a lower slot-cutting subassembly 14, and an upper plate insertion subassembly 16.

Support subassembly 12 basically is a suitable structural framework including for example, platform 20 on a plurality of legs 22. The lower slot-cutting subassembly 14 is suspended beneath this platform but has portions extendible upwardly therethrough in a manner to be described hereinafter. The upper plate inserting subassembly 16 is mounted above this platform. Extending upwardly from platform is upright column support means composed of a pair of diagonally oppositely positioned columns 26. To the upper ends of the columns is mounted a fixed plate 28. Mounted on top of this plate is the power motive means for subassembly 16, with the mechanism that is actually moved being beneath plate 28.

Subassembly 12 supports and retains pairs of spaced slab members to be interconnected, subassembly 14 dynamically spaces and cooperates with portions of subassembly 12 to retain the panels while cutting slots in the panels, and subassembly 16 advances with withdrawal of subassembly 14 to dynamically space the slotted slabs while inserting flanged plates therein.

Affixed to the top of platform 20 is platen 18. In this platen is an elongated central opening 30 through which the slab-spacing and slot-cutting portions of subassembly 14 protrude, all in a manner to be described hereinafter. Astraddle this opening is a pair of vertical retention plates which extend along platen 18. A pair of panels or slabs to be assembled are positioned against the inner faces of the plates 32 and 34 during operation. Normally, one of the plates, here plate 32, is fixed in position, as by being attached to fixed backup elements 40. The second plate 34 is movable transversely to its plane toward or away from the other plate to narrow or widen the space between the plates. It is guided in its movement by guide rods 42, which have their enlarged inner ends 42′ attached to plate 34, and which are slidable in sleeves assist affixed to platen 18 (FIG. 4). Plate member 34 is normally biased away from the other plate member by coil springs 46 between the guide rods and sleeves. Plate 34 can be forcefully shifted toward plate 32, against this bias and while so guided, by a pair of pneumatically operated cylinder and piston units 50. A pair of gross-position spacers 31 are located adjacent opposite ends of gripper plate members 32 and 34 (FIG. 4) to generally space and locate the slabs with respect to each other. These are laterally shiftable for reasons to be explained hereinafter. These components assist the spacers on subassemblies 14 and 16 in the proper spacing and retention of the slabs during the operation, as is explained more specifically hereinafter.

Cooperative with support subassembly 12 is the slot-cutting subassembly 14. This subassembly 14 includes a fixedly mounted base plate 60 spaced beneath central support platen 18, having its ends secured fixedly to a pair of braces 62 which in turn are attached to legs 22, and suspended beneath platen 18 by a pair of interconnected vertical cylindrical guide and support columns 68. A horizontal platen 66 is supported on columns 68 by a pair of slide bearings 70 so that platen 66 can be vertically shifted from a lowered position (FIG. 7) to an elevated position (FIG. 1). This is done by extending the cylinder piston rod 76 of fluid cylinder 78. The cylinder is mounted to fixed plate 60 by having its upper end secured to the underside of this plate. Rod 76 is attached to the underside of platen 66.

Extending upwardly from platen 66 is a plurality of spaced vertical bearing supports 82, here shown to be four in number. Extending between and through these bearing supports is a rotational shaft 84 which is driven by suitable drive means such as a belt 86' and pulley 86 connection. To the center and ends of the shaft are mounted circular saw blades 88 there shown to be three in number. Belt 86' extends downwardly and around a pair of idlers 87 (FIG. 8) and around the drive pulley of an electrical drive motor 89.

The rate of elevation of the cutting blades and the mounting assembly therefore by fluid cylinder assembly 78 is regulated by a damper. In this illustrated form, the damper unit is a fluid cylinder 90 having an internal piston (not shown) and an extended piston rod 92, with a fluid bypass conduit 94 between the ends of the cylinder, and a flow regulator valve 96 on this conduit. The extended end of rod 92 is attached to plate 96 by suitable bracket means. The fluid cylinder 90 is attached to fixed plate 60 by suitable bracket means 91. Movement of plate 66 is resisted by the friction of flow of fluid between the ends of cylinder 90 through the bypass conduit and restricter valve 96.

When cylinder 78 is actuated, (FIGS. blades move from a lowered position beneath platen 18 (FIGS. 7 and 8), through opening 30, (FIG. 4) to an elevated position above this platen (FIG. 1) and adjacent the upper edges of clamping members 32 and 34. Contraction of cylinder 78 retracts (lowers) these cutting blades again to the lowered inactive position. During raising and lowering, the saw blades are rotated by motor 89, with the slack of belt 86' being constantly adjusted by shifting of idler 87' with its support 91 on leaf spring 93 (FIG. 8).

Also mounted to supports 82 are a plurality of spacer, guide, and panel retention elements which in this illustrated form of the invention constitute pairs of rollers. These include upper rollers 100 (FIG. 7) the upper portions of which are generally adjacent the upper edge of the saw blades, and hence positioned to engage the inner faces of the slabs to be cut ahead of the engagement of the side edges of saw blades 88 with the slabs. These rollers are spaced apart an amount equal to the spacing desired between the panels when the slots are to be cut. Thus, as these bearing supports 82 are elevated, rollers 100 engage the inner faces of a pair of panels mounted inside of and against the inner faces of plates 32 and 34, to push the panels apart to the exact spacing therebetween necessary for the cutting operation. In addition to these upper rollers 100 which lead the saws, there are pairs of lower rollers 102 which follow the saws. These rollers 102, rotatably attached to supports 82, follow the blades during the cutting advancement, and lead them during the withdrawal of the blades from the panels.

As illustrated in FIG. 8, the space between the outer peripheral edges of these upper and lower rollers is less than the width of the saw blade 88 so that the blades will extend into the slabs a fraction of the slab thickness while the rollers are engaging and properly spacing the inner faces thereof. In other words, the width of the saw blades is greater than the spacing of the outer surfaces of the space roller members and less than the spacing of the inner faces of grippers 32 and 34 when in clamping position.

Subassembly 16 includes a platen 110 shiftable from an elevated position adjacent fixed plate 28 (FIG. 1) to a lowered position (FIG. 2). This is a power shift by fluid cylinder 112 mounted atop plate 28 and having an internal piston (not shown) and an extended piston rod 114 mounted at its lower extended end to the center of platen 110. This vertical movement is preferably guided and stabilized, as by a gear and rack mechanism including a pair of spaced vertical gear racks 116 mounted at their lower ends to platen 110, and engaging a pair of spur gears 117 on the opposite ends of shaft 118. The racks are retained in engagement with gears 117 by slide bearings 119 (FIG. 6) affixed to plate 28. Shaft 118 is mounted in suitable bearings 120 affixed to plate 28.

Suspended beneath and secured to the underside of platen 110 is a plurality of special units 130 which serve as spacer and retention means for the slabs being assembled, and which also serve as a retention chuck and guide means for the plates being inserted into the panels. Each of these units 130 includes guide rollers 132 mounted on one lateral face thereof, and has connector plate-supporting means on its opposite face. This opposite face is coplanar with one face of the respective saw blade i.e. transverse to the inner faces of the slabs such that, when a connecting plate to be assembled is retained on this opposite face, the connecting plate will be substantially coplanar with the saw blade and the slot formed by the saw blade. Preferably, the plates are magnetically held on units 130 by members 130 being of magnetic material or containing magnetic inserts. Members 130 are mounted to the underside of platen 110 as by flanges which also form stop-position means for vertically locating the plates retained on members 130. The plates are positioned transversely of the machine by having the back edge abut the front face of stationary vertical stop members 140 which are affixed to and depend from plate 28. Thus the plurality of plates can be rapidly slapped into place during operation.

The plates are thus directly coplanar with the slots, except for the flanges of the plates. The slots are cut across the grain of the wood normally used for slabs. These flanges are substantially normal to the slots, i.e. in line with the grain. When the flanges are forced into the slabs, they "lock" the slabs in relation to each other. The spacing of these slabs just prior to plate insertion (locking) is therefore important. Exact spacing during plate insertion is obtained with rollers on units 130. These rollers 132 again are in pairs, being spaced such that the distance between the outer peripheries thereof equal the space desired between the panels being assembled. There are a plurality (here three) of these pairs vertically arranged to follow each other down between the panels being assembled such that the rollers make multiple contact with the inner faces of the slabs to hold them exactly parallel and exactly spaced as the flanged plates are inserted into the slotted panels. The lowermost pair proceed the lower edge of the plate being inserted.

The term "slabs" is used herein to designate certain structural elements to be interlocked with rigid plates. The primary material presently employed for such slabs is wood, due to its complete adaptability to the product desired, substantial strength in the product, ability to be readily slotted, capacity to receive flanges of the locking plates under force, ease of surface finishing on the outer faces of both slabs, and other characteristics. Although the wood is normally of one layer it could be laminated with veneer of wood, plastic, or otherwise for decorative surfaces, strength, etc. Also, the invention could conceivably be adapted to other structural materials, provided the material has load strength in compression (when in walls), in compression and tension (when in floors or roofs), and other characteristics at least somewhat comparable to those noted above.

The binder "plates" interlocking the slabs are to be of a rigid material having sufficient compressive strength and resistance to malleability to withstand edge deformation when inserted. Further, they must have rigidity to withstand shear and lateral bending under racking force. Steel, particularly cold-rolled steel, has been found most suitable, particularly when having a thickness above about 0.025 inch. Conceivably other rigid materials in appropriate thicknesses could provide adequate strength characteristics under appropriate circumstances.

The operational sequence of the equipment and technique 184 explained particularly with respect to FIGS. 9A through 9C and 10A through 10D. Specifically, a pair of slabs S,S, are positioned against the inner faces of plates 32 and 34, astraddle of general spacers 31. The individual plates P are loaded onto magnetic chucks 130 against flanges 131 and stops 140. A plurality of slits are then cut into the inner faces of the slabs over the vertical extent thereof, at desired spaced intervals along the length thereof, by elevating lower subassembly 14. Power is supplied to the equipment through a main switch. The unit may be safely actuated by typical two-hand, palm-switch units 192, for example. This activates cylinder 78 and cylinders 50 (FIG. 4). Then cylinders 50 clamp the slabs and spacers 31 between gripping members 32 and 34. As subassembly 14 is elevated, in a regulated vertical movement due to the hydrocheck cylinder subassembly 90, 96, upper rollers 100 engage the lower portions of the inner face of slabs S (FIG. 10A) to force these panels apart to the exact desired space between the inner faces. This overcomes any bowing of slabs S along their length (between members 31). It also centers the blades with respect to the slabs to prevent one slab being slotted too shallow and the other too deeply. Hence, these cooperative components space, align, and retain the slabs in proper position. As the mechanism continues to elevate, the opposite side peripheral portions of blades 88 cut slots vertically into the faces to a controlled depth of a fraction of an inch. The particular depth of these slots can be varied with the thickness of the slabs, the type of usage to which the ultimate assembly will be adapted, and the like. The slots are preferably of slightly less thickness than the plates to be inserted for a tight fit. This elevating of subassembly 14 is continued until the slits are cut over the vertical extent of the slabs. The subassembly is then retracted. Then upper subassembly 16 is lowered by activating cylinder 112. This first causes engagement of leading rollers 132 to again spread the panel members to the desired spacing prior to engagement of the panels with plates P retained by units 130. These spacing members again obtain exact spacing between the slabs, overcome any bowing tendency of slabs 31, and center the slabs with respect to the plates to be and being inserted. The edges of the main plane of the plates are thus forced into the slots while the flanges are forced directly into the slabs normal to the slots. The slab support and retention means are located with respect to the plate insertion means to keep the slabs from deforming or shifting during plate insertion. When the plates are inserted to the correct depth, cylinder 122 retracts the subassembly. These rigid plates interconnect and interlock the slabs to form a sturdy, lightweight building block-type unit.

Figure 12:
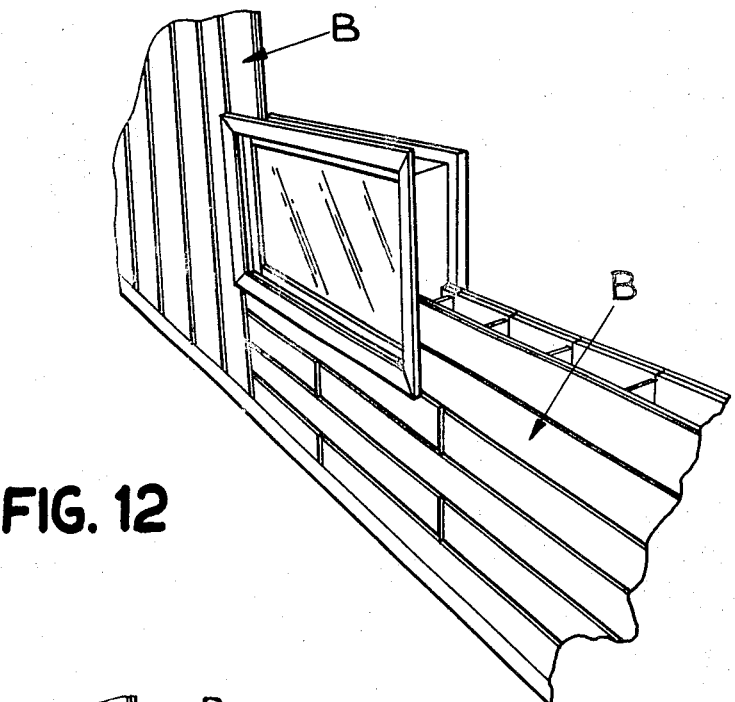
FIG. 12 is a perspective view of the structure in FIG. 11 from a different angle.
Figure 11:
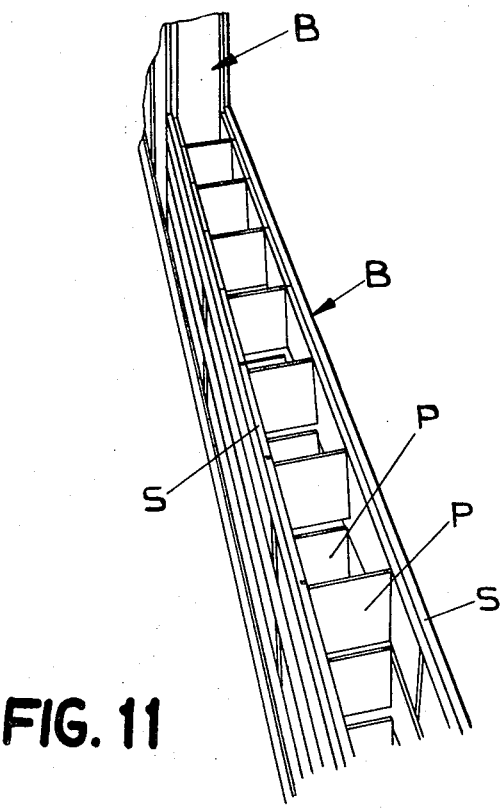
FIG. 11 is a perspective view of a wall being formed of the building block units.

The term "block" used herein is intended to include not only structural components having a length a small multiple of the width and/or height, but also greatly elongated components several feet in length, as well as those several inches in length. See for example the variations in blocks B in the illustrative wall "partitions" formed of several blocks in FIGS. 11 and 12. Further, the spacing between the slabs can be varied considerably although the range of 2 to 8 inches presently appears most practical. The slab thickness can also vary considerably although the range of ⅜ to 1 inch presently appears most practical.

Further, the number of saw blades and corresponding plate holders on the machine can be widely varied. These can be of varied spacing also, e.g. 8 or so apart for floor "partition" building "blocks," 16 or so for walls, etc. If blocks several feet in length are to be assembled, each may be done in stages, as by inserting three plates for example, then advancing this portion until a plate of the assembled portion strikes against a suitable stop, e.g. retractable cylinder-type stop 27 (FIGS. 2 and 4).

These and other obvious variations can be made within the concept presented herein.

It will be realized that, although platen 18 is arranged horizontally with subassembly 14 "below" it, and subassembly 16 "above" it, so that the basic equipment movements have a definite movement with respect to gravity in the illustrated embodiment, this vertical arrangement is not necessary to the invention so that terms such as up, down, above, below, lateral, and the like have a relative rather than an absolute meaning herein.

The embodiments of the invention in which an exclusive property or privilege is claimed are defined as follow.

I claim:

1. A machine for assembling slabs and interconnecting binder plates into building block units comprising: slab support means; slab retention means adjacent said support means to retain a pair of spaced slabs; slot-cutting means mounted adjacent said support, having cutting blade means oriented generally normal to said slab support means and having guide and spacer means for pushing the slabs apart against said slab retention means and positioning such with respect to said cutting blade means, said slot-cutting means being shiftable toward the space between said slab retention means sufficiently to shift said guide and spacer means between and against the slabs and to shift said cutting blade means between and into the inner portions of the slabs; binder plate insertion means adjacent said slab retention means, having binder plate retention means and having second guide and spacer means for pushing the slabs apart against said slab retention means and positioning such with respect to the binder plate retention means, said insertion means being shiftable toward the space between said slab retention means sufficiently to spread and align the slabs and push the binder plate edges into slots in the slabs; and power-shifting means for said cutting means and said insertion means.

2. The machine in claim 1 wherein said cutting means is opposite said insertion means with respect to said slab support means, and said cutting blade means are aligned with respect to said binder plate retention means.

3. The machine in claim 2 wherein said first-mentioned guide and spacer means have an effective spacing greater than the width of said cutting blade means and less than the spacing of said slab retention means.

4. The machine in claim 1 wherein said guide and spacer means has portions effectively offset toward said slab support means with respect to said cutting blade means to cause said portions to engage the slabs first, and has other portions effectively offset away from said slab support means with respect to said cutting blade means.

5. The machine in claim 4 wherein said second guide and spacer means has portions effectively offset toward said slab support means with respect to said binder plate retention means to cause said portions to engage the slabs first before plate engagement, and has second portions effectively offset away from said slab support means with respect to said binder plate retention means.

6. Apparatus for assembling panels and interconnecting binder plates into structural building units comprising: panel support and retention means arranged to retain a pair of panels in spaced parallel relationship; binder plate insertion means adjacent said first means, having binder plate retention means and having spreader and alignment means for pushing the panels apart against said panel retention means and aligning them with respect to said insertion means, said insertion means being shiftable toward the space between said panel support and retention means sufficiently to spread the panels and push the binder plate edges into the panels; and power-shifting means for said insertion means.

7. The apparatus in claim 6 wherein said portions of said spreader and alignment means are offset toward said panel support and retention means with respect to said binder plate retention means to cause said portions to engage the panels first.

8. Apparatus for assembling panels and interconnecting binder plates into structural building units comprising: panel support means; panel retention means adjacent said support means defining parallel zones to retain a pair of spaced panels therein in parallel relation; binder plate insertion means having binder plate retention means, said insertion means being shiftable in a path parallel to said zones and toward the space between said panel retention means to push the binder plates into and between the panels.

9. Apparatus for assembling slabs and binder plates into building block components comprising: slab support and retention means positioned to retain a pair of slabs in parallel-spaced relation; slot-cutting means shiftable to cut aligned slots into the inner faces of the slabs, transversely thereto; and plate insertion means aligned with said slot-cutting means, transverse to the slabs, and shiftable into the space between the pair of slabs to force the plate edges into the slabs and bindingly interconnect them.

10. The apparatus in claim 9 wherein said slot-cutting means has slab spacer and alignment means to control the depth of cutting in both slabs.

11. The apparatus in claim 9 wherein said plate retention and insertion means has slab spacer and alignment means to govern the depth of plate insertion into both slabs.

12. A method of assembling structural building units comprising the steps of: providing structural slabs having inner and outer faces; positioning a pair of slabs in spaced relationship between a pair of restrainer means; advancing slab-spreading, spacer and alignment means between the slabs to force them outwardly against said restrainer means while applying inward biasing force to said restrainer means to tightly secure and align the slabs, advancing transverse cutting blades into both of said inner faces to cut aligned slots in them; and forcing transverse flanged connector plates into and between said slotted slabs to secure them together.

13. The method in claim 12 wherein said plate-forcing step includes the advancing of second slab spreader, spacer and alignment means between said slabs.

14. A method of assembling structural building units comprising the steps of: providing structural slabs having opposite inner and outer faces; advancing cutting blades through the inner faces generally normal thereto to form slots; and ramming flanged connector plates into the slots while the slabs are secured with the slots aligned, to lockingly interconnect the slabs.